Figure 1:
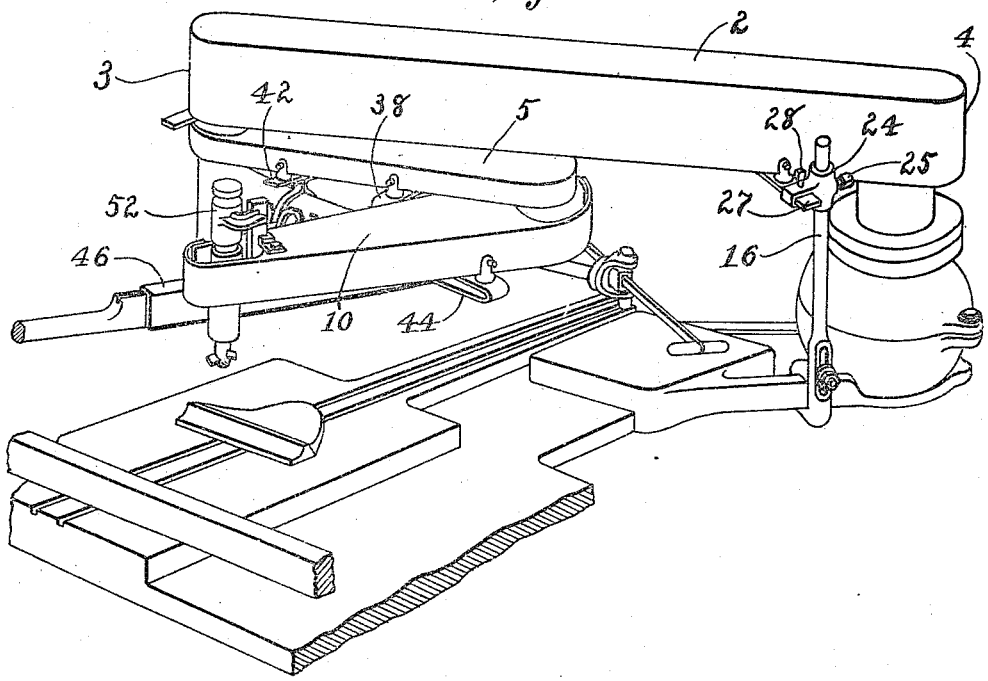

H. L. BOESIGER.
BELT GUARD.
APPLICATION FILED JAN. 22, 1917.

1,228,875.

Patented June 5, 1917.
3 SHEETS—SHEET 1.

Inventor:
Henry L. Boesiger
by Wilbur M. Stone.
his Attorney.

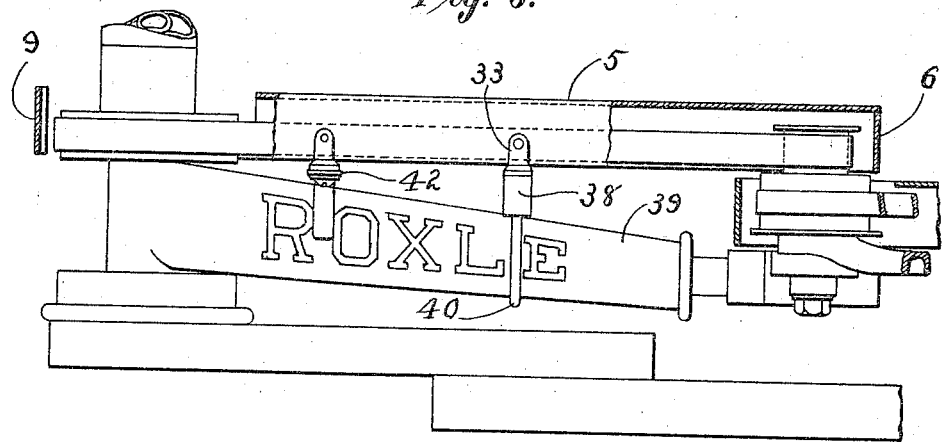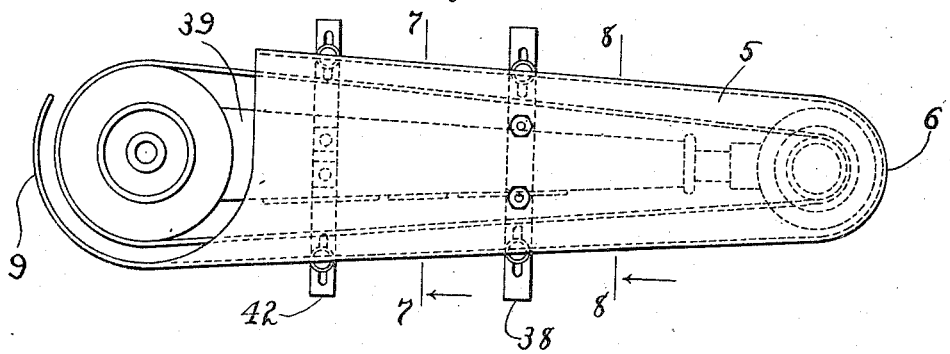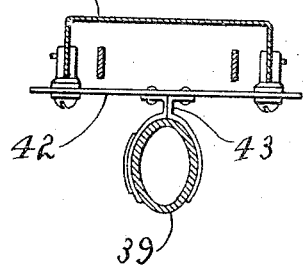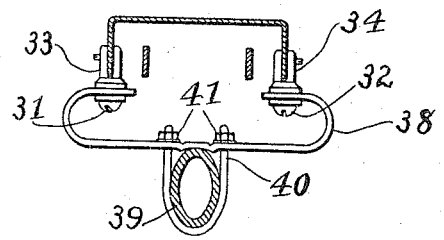

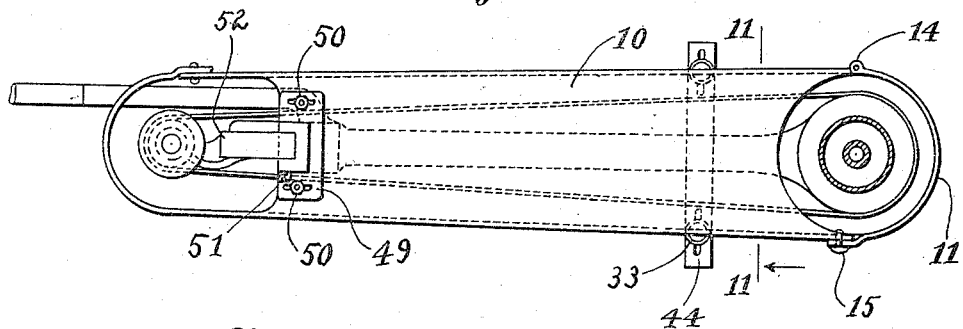
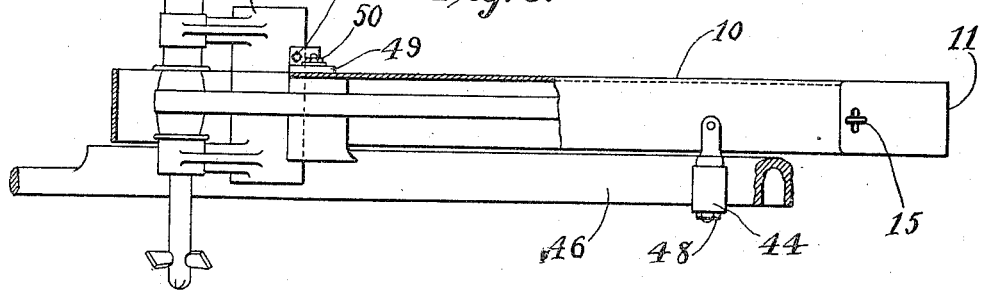
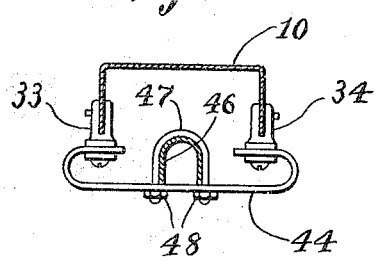
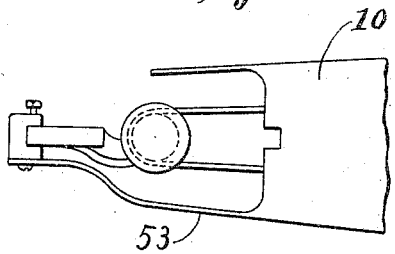
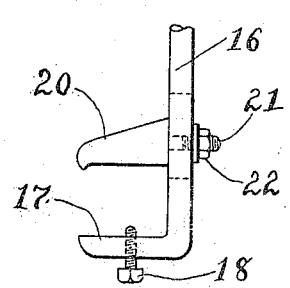
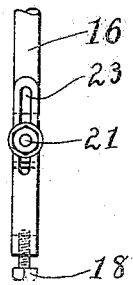

UNITED STATES PATENT OFFICE.

HENRY L. BOESIGER, OF SOMERVILLE, NEW JERSEY.

BELT-GUARD.

1,228,875. Specification of Letters Patent. Patented June 5, 1917.

Application filed January 22, 1917. Serial No. 143,605.

*To all whom it may concern:*

Be it known that I, HENRY L. BOESIGER, a citizen of the United States, and a resident of Somerville, in the county of Somerset and State of New Jersey, have invented certain new and useful Improvements in Belt-Guards, of which the following is a specification.

This invention relates to belt guards and has for its object to provide a device of the class specified in which the several parts are adjustable and therefore adaptable to a wide variety of uses. A further object of my improvements is to standardize several parts of my device so that each of them may be used in any of several portions of my device.

For convenience I have illustrated said improvements as applied to guarding the several belts of a routing machine, such as is commonly used by photo-engravers and the like; but it will be understood that my improvements are equally applicable to guarding belts on a wide variety of machines and that I do not limit myself to the particular showing of the drawings herein.

In its preferred embodiment my improvements comprise parts and combinations of parts illustrated in the drawings accompanying this specification, wherein—

Figure 2:
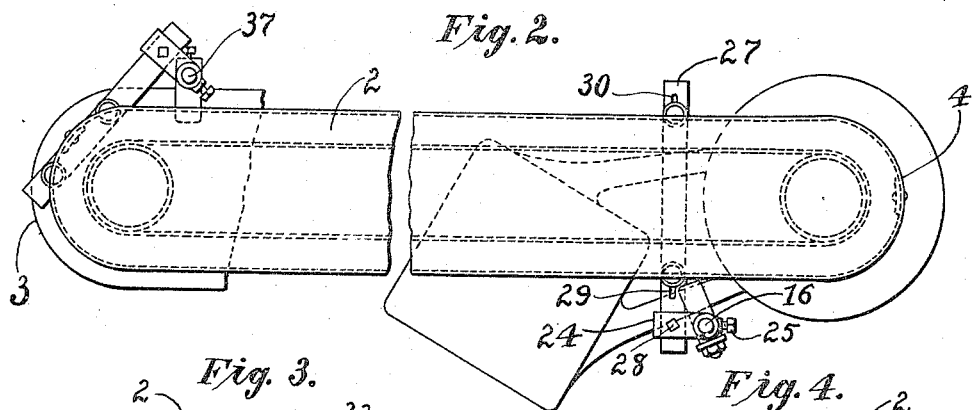
Figure 3:
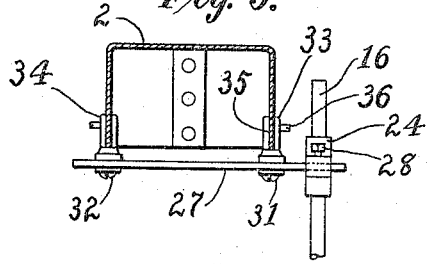
Figure 4:
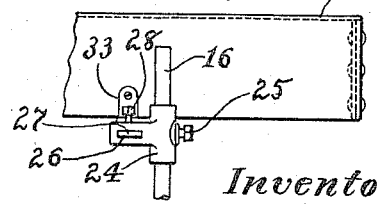

Figure 1 is a perspective view showing my improvements as adapted to guard the several belts of a machine employing one belt on fixed centers, and other belts on centers one or more of which are carried by swinging arms. Fig. 2 is a plan view of my improved guard as applied to a belt on two fixed centers. Fig. 3 is an end view, partly in section, of a portion of what is shown in Figs. 1 and 2. Fig. 4 is a front elevation corresponding with Fig. 3. Fig. 5 is a front elevation, partly in section, of a portion of what is shown in Fig. 1, and Fig. 6 is a plan view corresponding therewith. Fig. 7 is a sectional end view taken on line 7—7 of Fig. 6. Fig. 8 is a sectional end view taken on line 8—8 of Fig. 6. Fig. 9 is a side elevation, partly in section, of a portion of what is shown in Fig. 1, and Fig. 10 is a plan view corresponding therewith. Fig. 11 is a sectional end elevation taken on line 11—11 of Fig. 10. Fig. 12 is a plan view of a modification of a portion of what is shown in Fig. 10. Figs. 13 and 14 are side and front elevations, respectively, of a detail of my improvements. All the figures of the drawing are to one scale, except Figs. 13 and 14, which are to a larger scale.

In a device of the character specified, it is highly desirable to have a wide measure of adaptability in the several elements contributing to the whole, so that the device may be applied, without alteration of those elements, to a wide variety of environment. With this end in view my improved belt-guard comprises members which are adjustable in several particulars so that they may be conveniently assembled to meet a variety of requirements.

The shield for the belt is, for convenience, preferably formed of one piece of sheet metal and may assume proportions and details in accordance with the particular environment for which it is destined. For instance, while all of the shields illustrated are of reversed U cross-section, shield 2 has its lengthwise sides parallel and its ends 3 and 4 of semi-cylindrical contour; shield 5 has its lengthwise sides converging toward one end 6 thereof of semi-circular form, and with end 9 hook-shaped, so as to be easily removable from the pulley which it partially surrounds; and shield 10 is also slightly tapering and has its semi-cylindrical end 11 hinged to body portion 10 at 14 and latched thereto at 15.

Directing attention now to the supporting means for the several shields, and first to the means for supporting shield 2, one or more upright members, as 16, are provided therefor, best shown in Figs. 13 and 14. Said member 16 is furnished with arm 17 at its lower end and set-screw 18 is threaded therein. Above arm 17 and for coaction therewithin for gripping support 19, is arm 20 adjustably secured to support 16 by means of threaded stem 21 thereof and nut 22. Said stem 21 is adjustable vertically in slot 23 of member 16. Bracket 24, Figs. 1 to 4 inclusive, is slidably mounted on the upper portion of upright 16 and may be secured thereon in suitable position by set screw 25. Said bracket 24 is provided with a transverse slot 26 for the reception of transverse member 27 and is held in desired position therein by set screw 28. Said transverse member 27 has slots 29 and 30 suitably spaced apart therein for the passage of the shanks of set screws 31 and 32 for engaging and holding shield-supporting members 33 and 34, respectively. Said members 33 and 34 may swivel on said set screws to accommodate themselves to the edges of shield 2 which they engage. Said members 33, 34 are provided with slots, as 35 to member 33, for the reception of the lower edges of said shield. Set-screws, as 36 to member 33, are efficient to retain shield 2 in place in said members 33 and 34. A similar upright member 37 equipped with fastening means, adjustable bracket, transverse member and shield-supporting members, is preferably provided at the other end of said shield 2.

In the arrangement for supporting shield 5, Figs. 5 to 8 inclusive, transverse member 38 is somewhat modified in form and is secured directly to arm 39 of the machine by strap 40 and nuts 41. The ends of said transverse member are slotted as previously described for the reception of set-screws 31 and 32, which secure shield-supporting members 33 and 34, all as previously described. A further support for shield 5 may be employed, its transverse member 42 being provided with bracket 43, resting on arm 39 of the machine.

For supporting shield 10, Figs. 9 to 11 inclusive, transverse member 44 may be secured to arm 46 of the machine by strap 47 and nuts 48. The ends of said transverse member 44 are provided with shield-supports 33 and 34 as already described in connection with shields 2 and 5. A further support for shield 10 is provided, comprising bracket 49 adjustably secured to said shield by screws 50 and clamped to cutter-head 52 by set screw 51. An alternate arrangement of cutter-head is shown in Fig. 12, wherein the clamping member of Figs. 9 and 10 is secured to side-plate 53 of guard 10.

It will thus be seen that my improved belt guard is readily adaptable to a variety of machines and may be readily adjusted and assembled in place with simple tools and without special skill.

I claim:

1. In a belt-guard the combination of a shield for the belt, means for supporting said shield including an upright member, means thereon for gripping a support, a member slidable on said upright member, a transverse member carried by and adjustably secured to said slidable member, and shield-supporting means adjustably secured to said transverse member.

2. In a belt-guard the combination of a shield for the belt, a detachable support therefor comprising an upright member, adjustable means thereon for gripping a support, a bracket slidably mounted on said upright member, means for securing said bracket to the upright member, a transverse member carried by and adjustably secured to said slidable member, and shield-supporting means adjustably secured to said transverse member.

3. In a belt-guard the combination of a shield for the belt, means for supporting said shield including an upright member, means thereon for gripping a support, a bracket slidably mounted on said upright member, means for securing said bracket to the upright member, a transverse member, means for supporting said transverse member, a shield-supporting member pivotally mounted on said transverse member, means for securing said shield-supporting member to said transverse member, and means for securing said shield-supporting member to said shield.

4. In a belt-guard the combination of a shield for the belt, means for supporting said shield including an upright member, means thereon for gripping a support, a transverse member carried by and adjustably secured to said support gripping means, a shield-supporting member pivotally mounted on said transverse member, means for securing said shield-supporting member to said transverse member, and means for securing said shield-supporting member to said shield.

5. In a belt-guard the combination of a shield for the belt, means for supporting said shield including a transverse member, means for supporting said transverse member, and shield-supporting means adjustably secured to said transverse member.

6. In a belt-guard the combination of a shield for the belt, means for supporting said shield including a transverse member, means for supporting said transverse member, a shield-supporting member pivotally mounted on said transverse member, means for securing said shield-supporting member to said transverse member, and means for securing said shield-supporting member to said shield.

7. In a belt-guard the combination of a shield for the belt, means for supporting said shield including an upright member, a bracket slidably mounted on said upright member, means for securing said bracket to the upright member, a transverse member carried by and adjustably secured to said slidable member, and shield-supporting means adjustably secured to said transverse member.

8. In a belt-guard the combination of a removably mounted shield, means for supporting said shield including a transverse member, means for supporting said transverse member, and shield-supporting means adjustably secured to said transverse member.

Signed at New York, borough of Manhattan, in the county of New York and State of New York, this 13th day of January, 1917, before two subscribing witnesses.

HENRY L. BOESIGER.

Witnesses:
 JAMES A. CASE,
 CHAS. W. LA RUE.

Copies of this patent may be obtained for five cents each, by addressing the "Commissioner of Patents, Washington, D. C."